US012789180B2

(12) United States Patent
Brabetz

(10) Patent No.: US 12,789,180 B2
(45) Date of Patent: Nov. 10, 2026

(54) PIPETTE TIP

(71) Applicant: Eppendorf SE, Hamburg (DE)

(72) Inventor: Vito Brabetz, Ahrensburg (DE)

(73) Assignee: Eppendorf SE, Hamburg (DE)

( * ) Notice: Subject to any disclaimer, the term of this patent is extended or adjusted under 35 U.S.C. 154(b) by 1175 days.

(21) Appl. No.: 17/703,007

(22) Filed: Mar. 24, 2022

(65) Prior Publication Data

US 2022/0305484 A1 Sep. 29, 2022

(30) Foreign Application Priority Data

Mar. 26, 2021 (EP) .................................... 21165248

(51) Int. Cl.
*B01L 3/02* (2006.01)

(52) U.S. Cl.
CPC ........... *B01L 3/0275* (2013.01); *B01L 3/0217* (2013.01); *B01L 2200/025* (2013.01); *B01L 2200/026* (2013.01); *B01L 2200/04* (2013.01); *B01L 2200/0605* (2013.01); *B01L 2200/0689* (2013.01); *B01L 2200/085* (2013.01); *B01L 2300/0609* (2013.01); *B01L 2400/049* (2013.01)

(58) Field of Classification Search
None
See application file for complete search history.

(56) References Cited

U.S. PATENT DOCUMENTS

| | | | | |
|---|---|---|---|---|
| 2005/0069460 A1 | 3/2005 | Lohn | | |
| 2013/0068041 A1* | 3/2013 | Naumann | ............. B01L 3/0275 | 73/864.01 |
| 2021/0213441 A1* | 7/2021 | Rethwisch | ............ B01L 3/0279 | |

FOREIGN PATENT DOCUMENTS

| | | | |
|---|---|---|---|
| CN | 103170386 | A | 6/2013 |
| CN | 110944751 | A | 3/2020 |
| CN | 112512692 | A | 3/2021 |
| EP | 3575000 | A1 | 4/2019 |
| JP | 2005103542 | A | 4/2005 |
| JP | 2013-136052 | A | 7/2013 |

OTHER PUBLICATIONS

JP 2022-050053;Filed Sep. 17, 2020; Office Action dated Feb. 3, 2023 (4 pages).
JP 2022-050053;Filed Sep. 17, 2020; English translation of Office Action dated Feb. 3, 2023 (3 pages).
CN 2022-10305620;Filed Mar. 25, 2022; Office Action dated Nov. 14, 2023 (7 pages).
CN 2022-10305620;Filed Mar. 25, 2022; English translation of Office Action dated Nov. 14, 2023 (7 pages).

* cited by examiner

*Primary Examiner* — Brittany I Fisher
(74) *Attorney, Agent, or Firm* — Barclay Damon LLP

(57) ABSTRACT

A pipette tip made of plastic includes a tubular body having an inner circumference and an outer circumference. The tubular body includes a bottom end defining a bottom opening structured to enable passage of a liquid and a top end defining a top opening that clamps onto a mount of a pipetting device. A seat region for the mount is positioned proximate to the top opening and on the inner circumference of the tubular body. A plurality of flattenings extend in an axial direction on the outer circumference proximate to the top opening. The tubular body defines a contour of an arc polygon in a cross-section through the flattenings on the outer circumference.

20 Claims, 7 Drawing Sheets

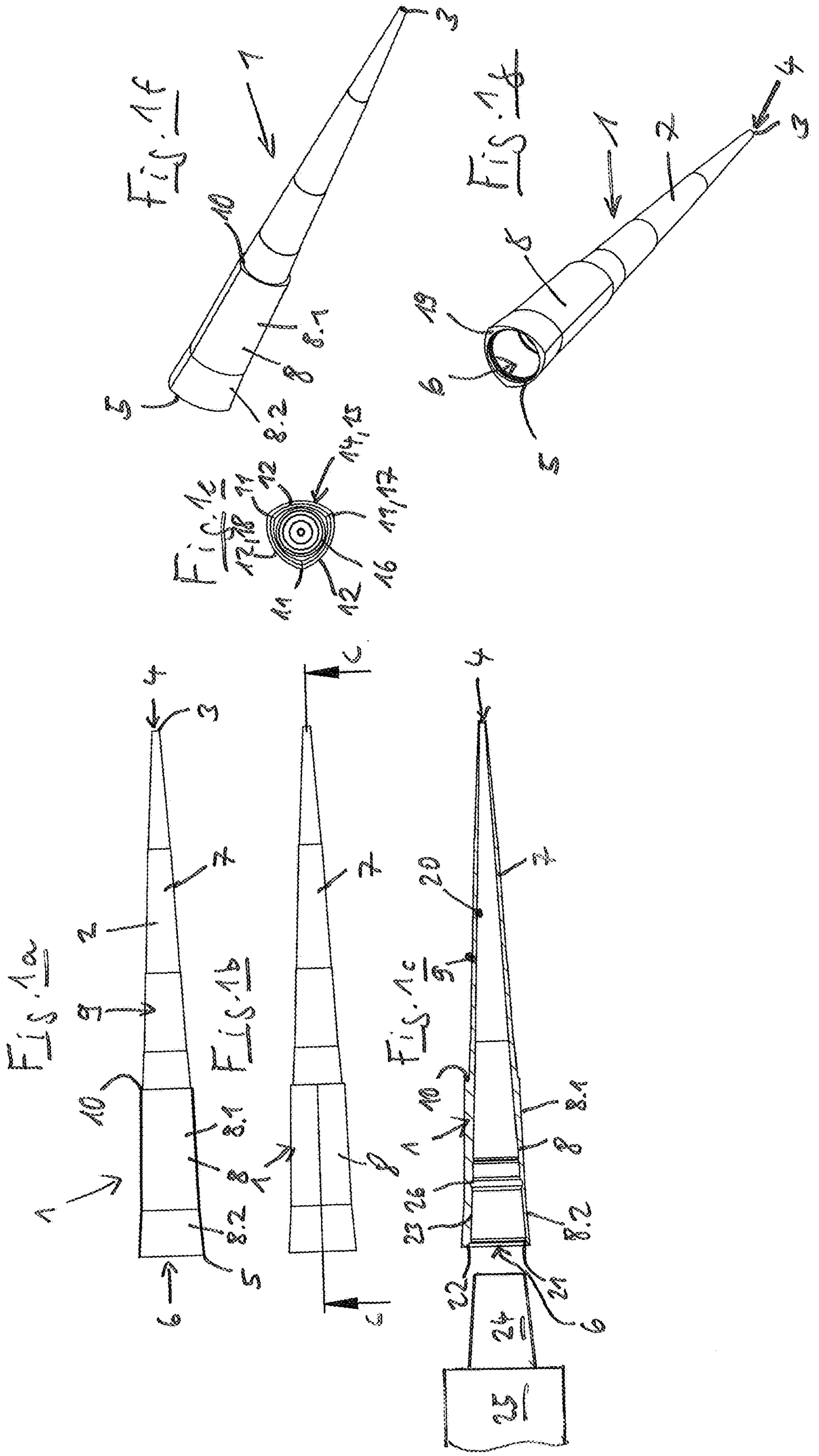

PIPETTE TIP

CROSS REFERENCE TO RELATED INVENTION

This application is based upon and claims priority to, under relevant sections of 35 U.S.C. § 119, European Patent Application No. 21165248.2, filed Mar. 26, 2021, the entire contents of which are hereby incorporated by reference.

TECHNOLOGICAL FIELD

The disclosure relates to an inventive pipette tip used with a pipetting device.

BACKGROUND

Pipette tips are used together with pipettes and other dosing devices in particular in medical, biological, biochemical and chemical laboratories for dosing liquids. In the following, pipettes and other dosing devices will be jointly termed "pipetting devices". Pipette tips have an elongated tubular body that has a bottom opening in the bottom end for the passage of liquid, and a top opening in the top end for clamping onto the mount of a pipetting device. Pipette tips usually have a generally conical shape whose cross-section enlarges from the bottom opening toward the top opening. Standardized conical, or respectively frustoconical mounts (working cone) are known with a standard geometry that is uniformly used by many manufacturers and that is characterized for each pipette tip size by a specific average diameter and by a specific cone angle of the conical mount.

Multichannel pipetting devices serve to simultaneously draw liquid from one or more vessels, or respectively to discharge liquid into one or more vessels. They are frequently used to process microtiter plates that have a plurality of vessels in a matrix-like arrangement. To accomplish this, multichannel pipetting devices have several conical mounts, arranged parallel next to each other in one or more parallel rows, onto which the pipette tips can be clamped. Multichannel pipettes with 8, 12, 16 or 24 mounts in a row are known in an adaptation of a frequently used format of microtiter plates with 96 (8×12) or 384 (16×24) vessels (wells) according to the ANSI standard. Multichannel dosing devices with a dosing head that has 96 or 384 mounts are also known. Corresponding to the spacing of adjacent vessels of microtiter plates with 96 or 384 vessels, adjacent mounts have a spacing of 9 mm or 4.5 mm from each other.

When designed as an air cushion pipetting device, the pipetting device has at least one displacement apparatus for air which is communicatingly connected to a through-hole of at least one mount. An air cushion is displaceable by means of the displacement apparatus in order to draw liquid into a pipette tip clamped onto the mount and eject it therefrom. The displacement apparatus is generally designed as a cylinder with a plunger that is movable therein. However, displacement apparatuses are also known with a displacement chamber and at least one deformable wall, wherein a deformation of the wall causes the displacement of the air cushion.

In the embodiment as a positive displacement pipetting device, a small plunger is arranged in the pipette tip that, when the pipette tip is being mounted on a mount, is coupled to a coupling element of a plunger drive of the pipetting device that is displaceable in a through-hole in the mount.

The liquid is preferably drawn into the pipette tip in a single step or in several small steps. The liquid is discharged in a single step when pipetting, and discharged in several-steps when dispensing.

Pipetting devices generally have an ejector that acts on the top edge of the pipette tip in order to press it off of the mount. With multichannel pipetting devices, the ejector can simultaneously be pressed against the top edges of several pipette tips. By means of the ejector, the user can disconnect pipette tips contaminated with—from the mount without grasping them.

The pipetting device can be a manual pipette that the user can hold and actuate with just one hand It can also be a dosing station ("pipetting station") or a dosing machine ("pipetting machine") in which a dosing head with one or more mounts is displaceable on a robot arm or on another transfer system above a work surface. The pipetting device can also be part of a laboratory machine ("workstation") that can perform additional treatments of liquid (such as mixing, heating and analyzing) in addition to dosing.

To prevent incorrect dosing, the pipette tip must be clamped onto the mount sufficiently securely or respectively sealingly. Moreover, the forces for mounting and ejecting the pipette tip onto/off of the mount must not be too great. Conventional pipette tips are thick-walled and rigid in the contact region with the conical mount. While being mounted, the pipette tips are elastically expanded at the circumference by the mount. The spring characteristic is steep, such that high mounting forces must be applied. After mounting, a correspondingly high static friction acts between the mount and the pipette tip that must be overcome during ejection. The user is stressed by the high forces for mounting and ejecting the pipette tip. This can trigger disorders that are summarized under the term "cumulative trauma disorders" (CTD). If mounting and ejection are performed by means of motorized drives, such drives must be correspondingly powerful and they have high power consumption.

U.S. Pat. No. 6,197,259 describes a pipette tip that can be mounted securely onto a mount of a pipette by applying relatively low axial mounting forces of 6 pounds (26.7 N), and can be ejected therefrom by applying relatively low ejection forces of 3 pounds (13.3 N). The pipette tip has a conical top end with an inner diameter at the top end that is greater than the diameter of the mount of the pipette onto which the pipette tip is to be mounted. Furthermore, the pipette tip has a hollow middle section and an annular sealing region at the connection between the top end and the middle section. The middle section has a side wall on and next to the sealing region with a wall thickness between 0.2 and 0.5 mm. The annular sealing region has an inner diameter that is less than a value "x" and is designed such that it engages with the bottom end of a sealing zone of the mount in order to be radially expanded when the mount is inserted. This creates a liquid-tight seal between the sealing zone of the mount and the sealing region of the pipette tip. Furthermore, on the inside next to the sealing region, the pipette tip has lateral stabilization means that engage with the outer surface of the mount in order to stabilize the pipette tip on the mount. The lateral stabilization means have at least three contacts at a distance from each other in the circumferential direction which extend inward from the inner surface of the pipette tip. The diametrical distance between the contacts is dimensioned such that they easily engage with the bottom end of the mount and enable the bottom end to slide past without the side walls of the pipette tip on which the contacts are arranged being expanded. When the bottom end of the sealing zone of the mount engages with the sealing region of the pipette tip, the pipette tip is stretched in the sealing region and directly adjacent thereto. When the contacts guide the pipette tip onto the mount, the side wall of the pipette tip deforms inwardly between the contacts and is not expanded, by which the force to be applied for pressing on the mount is minimized. The mount can be pressed deeper into the pipette tip with increasing mounting force. Accordingly, high ejection forces must be applied to release the pipette tip from the mount. Given the inwardly projecting contacts, the design is only suitable for comparatively large pipette tips.

U.S. Pat. No. 6,568,288 describes a pipette tip that has annular sealing regions that are axially spaced from each other and substantially cylindrical lateral guide regions, wherein the sealing region is sufficiently thin to form a press fit and airtight seal between a sealing surface of the sealing zone and the sealing region upon penetration of a mount of a pipette with annular sealing zones that are axially spaced from each other and cylindrical lateral guide zones. The wall thickness in the sealing region is preferably between 0.2 and 0.5 mm. The sealing surface is the outer surface of an annular projection that projects radially outward next to the bottom end of the mount. The pipette tip has an annular upwardly facing and inwardly directed shoulder on the inner circumference in order to restrict the mounting on the mount. The force should be approximately 2 pounds (8.9 N) for mounting, and approximately 1 pound (4.45 N) for ejecting. Due to the depth stop, incomplete insertion can occur while simultaneously picking up several pipette tips from a tray or rack by means of a multichannel pipetting device. If the tray or rack sags downward slightly between side edges, mounting the two outer mounts on the shoulders of the two outer pipette tips can result in insufficient insertion of the other mounts into the pipette tips arranged therebetween.

U.S. Pat. No. 6,967,004 B2 describes a pipette tip that has an annular sealing region with an inner sealing surface on a side wall that is thin enough in the sealing region to expand slightly and form a press fit and an airtight seal between the sealing surface and a sealing zone of a mount of the pipette inserted into the pipette tip. The pipette tip has an annular shoulder that faces inward and upward which restricts the insertion of the mount. The mount has two cylindrical sections with different diameters. Its annular sealing zone encloses a sealing edge at a connection between the bottom end of a cylindrical section and the outermost edge of a radially extending transition of the mount. Preferably, the forces for inserting and ejecting the pipette tip are less than 2 pounds (8.9 N). The depth stop can lead to incomplete insertion of mounts while simultaneously picking up several pipette tips by means of a multichannel pipetting device.

EP 2 138 234 A1 describes a pipette tip that has, at the top end of an elongated, tubular section, a flexible, tubular connecting section with a contour having a wave-shaped cross-section which increases the elasticity of the seat region for releasably connecting to the mount of a pipetting device. The seat region is reversibly expandable by more than 20% while being mounted on the mount. To achieve a sealing seat, the wave-shaped contour must be stretched smooth on the mount, as a result of which the additional elasticity is only slight. Consequently, precise production of the pipette tip is required. Furthermore, a shoulder that projects radially inward is present between the seat region and tubular region and creates a depth stop for the mount that can lead to insufficient insertion of mounts while pipette tips are being picked up by means of a multichannel pipetting device.

EP 2 606 977 A1 describes a pipette tip with the shape of an elongated tube having a bottom opening in the bottom end for the passage of liquid, and a top opening in the top end, wherein there is a seat region on the inner circumference next to the top opening that serves for mounting on a standardized conical mount of a pipetting device. The seat region has a holding region with axially extending ribs that project radially inward, and a sealing region below the holding region with an inwardly projecting sealing region running around the circumference. The seat region is designed such that, while being mounted on the mount with a mounting force which ensures that the pipette tip is held and sealed on the mount, the ribs are partially deformed plastically, and an elastic deformation occurs outside the ribs in the seat region. Below the sealing region, the pipette tip has a braking region that expands conically toward the top opening to restrict the mounting. This ensures a reliable seal on the mount of a pipetting device and substantially reduces the ejection force to be applied for ejection. The design is particularly suitable for comparatively large pipette tips with 2.5, 5.0 and 10 mL nominal volumes. It is less well suited to smaller pipette tips given the difficult production of the delicate ribs.

EP 3 115 110 A1 describes a pipette tip with a tubular body and a seat region for being mounted on a conical mount of a pipetting device that has a circumferential, inwardly projecting sealing projection on the inner circumference at a distance from the top opening, a circumferential braking region below the sealing projection that tapers downward more strongly than the mount, and a circumferential, inwardly projecting supporting projection above the sealing projection. The sealing projection can be sealingly clamped onto the mount under elastic deformation, wherein the braking region lies further below against the mount, and the supporting projection lies further upward against the mount without preload, or is at a distance from the across a circumferential gap. The pipette tip can be clamped in an effectively sealing manner and reliably onto the mount of a pipetting device, is ejectable from the mount with reduced exertion of force, and is also highly suitable for smaller pipette tip sizes. A disadvantage is the still high exertion of force when clamping onto the mount and when pulling off of the mount.

WO 2011/091308 A2 describes a pipette tip that has an annular flange on the proximal end of a proximal section and axially facing ribs in the proximal section that are at a distance from each other in the circumferential direction. The flange is intended to increase the rigidity of the pipette tip and facilitate the alignment of the dispenser on the pipette tip. The ribs are intended to limit the axial expandability of the pipette tip in the proximal region. The mounting forces of the pipette tips with 200 μl and 1,000 μl fill volumes on five different pipettes are more than 1,000 g (10 N) and range up to 2,000 g (20 N).

An ergonomically optimized pipette tip is known from U.S. Pat. No. 7,335,337 B1 that can be fixed in an operationally reliable manner on a pipette, wherein the mounting forces and ejection forces are reduced. The pipette tip has elastic expansion elements by means of which the axial mounting force and ejection force are reduced. The elastic expansion elements are arranged in a top section of the pipette tip above a sealing ring running around the inner circumference. They are formed by outwardly curving regions with a reduced wall thickness between cylindrical or conical segments of the pipette tip. When a mount of a pipette is inserted into the top opening of the pipette tip, the expansion elements are drawn flat, and the segmented wall sections expand. The pipette tip is guided and aligned on the mount by ribs on the inside of the wall segments. The mounting forces are however still high because the pipette tip in the region of the circumferential sealing ring has a large wall thickness and can only expand slightly, and they increase significantly when the expansion elements are drawn flat.

WO 2018/213196 A1 describes a pipette tip with a proximal section having alternating, longitudinally-oriented grooves and panels that are designed to facilitate the expansion and compression of the wall when the pipette tip is attached to a correspondingly designed discharge device and is sealingly engaged therewith. Through these measures, the axial force is reduced for clamping a pipette tip onto a discharge device and releasing a pipette tip from a discharge device for liquid. The grooves are stepped, V-shaped or U-shaped. A plurality of grooves and panels are alternatingly arranged on the circumference of the proximal section. To form the grooves, narrow areas and the corners at approximately right angles between the grooves and panels must be filled with plasticized plastic compound during injection molding in the injection mold. This limits the output and reduces the dimensional accuracy and strength of the pipette tip. There is also the risk of the pipette tip bursting at the base of the grooves while being clamped onto the mount and not sitting on the mount in a sealing manner. It is moreover difficult to mark the pipette tip because of the pronounced structuring of the proximal section of the pipette tip.

BRIEF SUMMARY OF THE INVENTION

Against this backdrop, the object of the invention is to provide a pipette tip that can be clamped sufficiently tightly and sealingly onto a mount of a pipette tip with reduced mounting force and ejection force, has improved production properties with better dimensional accuracy and strength, and is more suitable for marking different pipette tip types.

An embodiment of a pipette tip made of plastic comprises an elongated, tubular body with a bottom opening in a bottom end of the tubular body for the passage of liquid, and a top opening in a top end of the tubular body for clamping on to a mount of a pipetting device. There is a seat region for the mount on the inner circumference of the tubular body next to the top opening, and the tubular body has a plurality of flattenings extending in the axial direction on the outer circumference next to the top opening. The tubular body has the contour of an arc polygon in a cross-section through the flattenings on the outer circumference.

In an embodiment, the pipette tip has a wall thickness in the region of the flattenings that is less than at the two lateral edges of the flattenings. This improves the deformability of the pipette tip when clamping onto a mount of a pipetting device, such that a reliable seal of the pipette tip on the mount can be achieved even with comparatively slight mounting forces. The pipette tip can be configured such that it is only deformed elastically while being clamped with a specific force onto a defined mount of a pipetting device. It can however also be configured such that it is only deformed plastically while being clamped with a specific force onto a defined mount of a pipetting device. During the elastic deformation, the mounting force increases proportionally to the deformation. The elastic deformation can reverse completely after the pipette tip is released from the mount. If the elasticity threshold is exceeded, plastic deformation occurs. The plastic deformation is an irreversible deformation that does not independently reverse after the pipette tip is released from the mount. With plastic deformation, the mounting force does not increase at all or only slightly with the deformation. The elastic or plastic deformation preferably occurs in the region of the flattenings since the pipette tip has the smallest wall thickness next to the top opening in the region of the flattenings. This can minimize the exertion of force for sealingly mounting the pipette tip on the mount. In the case of plastic deformation, the mounting force can be limited to a preset limit value.

In the cross-section through the tubular body, the flattenings with their respectively arced profile define an outer circumference of the tubular body in the shape of an arc polygon. With an arc polygon, the sides are formed by arcs that extend between respectively two adjacent corner points. According to a preferred embodiment, the arc polygon is a regular arc polygon, such as for example the Reuleaux polygon. An arc polygon is based on a polygon, the sides of which are replaced by circular arcs between respectively two adjacent corner points, the midpoint between which is the opposing corner point. The intersection (the common surface) of the circles forms the arc polygon. The base polygon must be convex and must not be self-intersecting. A regular arc polygon is based on a regular polygon that has equally long sides as well as equally sized interior angles. A special case are bodies of constant width whose underlying polygons have an odd number of corners, such that every possible diameter of the body is the same amount (constant width).

Particularly advantageous is the favorable relationship between the thick-walled and thin-walled regions of the cross-section. The thin-walled regions bring about a reduction in the force required to expand the pipette tip while clamping onto a mount, and thereby also effect a reduced mounting force. Given the increased flexibility, the pipette tip can be more easily used with mounts having different shapes and/or dimensions. The thick-walled regions are also advantageously usable as a contact surface for the ejector of a pipette, for reliably releasing the pipette tip from a mount. Depending on the design of the pipette tip, the thickened regions can also be used for an effective mount in the tray (holder for pipette tips) that has holes into which the pipette tips are inserted, and on the top edge of which they are supported by the thickened regions. Accordingly, the ratio of thick-walled and thin-walled regions of the cross-section in combination with the reduced expansion force is particularly advantageous. Moreover, the cross-sectional area and therefore the weight of the pipette tip and the plastic material needed for production can be reduced by the outer contour of the tubular body in the shape of an arc polygon. Another advantage makes it possible to distinguish between pipette tip types by the special outer appearance of the pipette tips with the outer contour in the form of an arc polygon. A simulated comparison of a pipette tip with the outer contour in the shape of an arc polygon with a conventional hollow cylindrical pipette tip has shown that the expansion force to be applied while being mounted on the mount can be reduced by up to about 35%.

For production by injection molding, it is advantageous that the plastic compound can better fill the cavity in the injection mold in the region of the flattenings due to the lower pressure losses at the flattening than in the region of the grooves in conventional pipette tips. This also allows weld lines to be reduced and more dimensionally accurate and stronger pipette tips to be achieved. The increased strength can prevent the pipette tips from bursting at the places of least wall thickness due to the mounting forces.

Another advantage is that the flattenings can be used to identify the pipette tips. In particular, information about the pipette tip and/or its manufacture can be applied to the flattenings during injection molding, for example about the pipette tip size, the material, or the purity grade of the pipette tip, the manufacturer, the brand, and/or the production tool used for production. The pipette tip size refers to the greatest volume that can be dosed with the pipette tip. Pipette tips that differ from each other by at least one of the aforementioned criteria are also termed "pipette tips of different pipette tip types" in this application. The identification can be created during injection molding in the form of raised or recessed letters, numbers, characters or symbols, or can be printed on later. Furthermore, identification by the user is possible, for example by printing, labeling using a writing tool, or adhering a label. Moreover, the flattenings can be used as such as an identification feature to distinguish different pipette tip types from each other. The flattenings can also serve as roll protection to prevent a pipette tip placed on a work surface or other surface from rolling away.

According to one embodiment, the pipette tips comprise sides of the arc polygon that are curved to the outside, such that the flattenings have an outwardly (convex) curved profile in a cross-section through the tubular body. According to another embodiment, the aforementioned pipette tips comprise sides of the arc polygon that are curved to the inside, such that the flattenings have an inwardly (concave) curved profile in a cross-section through the tubular body. According to another embodiment, the profile of the flattenings is largely or exclusively curved outward or largely or exclusively curved inward. According to one embodiment, the radius of curvature is constant along the particular profile. According to another embodiment, the radius of curvature varies along the particular profile, or a part thereof. According to another embodiment, the profile of the flattenings is sectionally curved equivalently or differently. For example, the profile of the flattenings at the two edges is curved outward or linear, and is curved outward or inward therebetween, such that overall, it is approximately V-shaped. According to another embodiment, the profile of the flattenings is sectionally curved differently. In the case of different curvatures, these can be curves with different radii of curvature, or outward or inward curves with the same or different radii of curvature. The curvature designates the reciprocal of the radius of curvature of the particular profile.

According to another embodiment, in all cross-sections through the flattenings, the tubular body has just one profile in the flattenings curved with the same radius of curvature, or has a profile curved with different radii of curvature in different cross-sections, wherein the curvature of the profile preferably changes gradually from cross-section to cross-section. According to another embodiment, the flattenings have an outwardly curved profile and an inwardly curved profile in different cross-sections, wherein the curvature of the profile preferably changes gradually from cross-section to cross-section.

According to another embodiment, the wall thickness of the tubular body decreases gradually in a cross-section through the tubular body, starting in each case from one of the two edge regions of each flattening in the flattening toward its central region. The gradual decrease in the wall thickness helps the cavity in the injection mold fill evenly, and excessive stress when clamping the pipette tip onto a mount is prevented.

According to another embodiment, the flattenings extend upward up to a distance from the top end of the tubular body. This allows a top edge with an even wall thickness that runs around the top end of the pipette tip, which is advantageous for ejecting a pipette tip from a mount by means of an ejection apparatus of the pipette apparatus. According to another embodiment, the top edge of the pipette tip is a circumferential flange. The flange can be used to hold a pipette tip in a hole of a holder for pipette tips (rack).

According to another embodiment, the flattenings extend up to the top end of the tubular body. Extending the flattenings up to the top end is advantageous for the deformation of the pipette tip with less exertion of force.

According to another embodiment, the tubular body has a shoulder on the outer circumference. The pipette tip can be supported by the shoulder in a hole of a holder for pipette tips. According to another embodiment, the flattenings extend downward, at least to the shoulder or beyond it.

According to another embodiment, the tubular body has three to ten, preferably three, four, or five flattenings on the circumference. Due to the several flattenings, the exertion of force to deform the pipette tips can be further reduced. Furthermore, different pipette tip types can be identified differently by means of pipette tips having a different number and/or dimensions (such as with different a width and/or curvature) of the flattenings.

According to another embodiment, all of the flattenings have the same width and same curve. According to another embodiment, the flattenings run parallel to the center axis of the tubular body, or helically around the center axis of the tubular body. Given a helical course, each flattening extends for example only over a fraction of the circumference of the tubular body, or once or more than once around the circumference of the tubular body. According to another embodiment, the seat region is conical and/or cylindrical.

According to another embodiment, the tubular body has at least one sealing structure on the inner circumference of the seat region that projects inward and runs in a circumferential direction, and/or at least one inwardly projecting guide structure running continuously, or having several sections at a distance from each other, in a circumferential direction, and/or at least one inwardly projecting braking structure running continuously, or having several sections at a distance from each other, in a circumferential direction. According to another embodiment, the sealing structure is a sealing bead, and/or the guide structure is a guide bead and/or a guide rib and/or bump or wart-shaped guide projections, and/or the braking structure is a braking bead and/or a conical braking region.

The sealing structure creates a ring support between the mount of the pipetting device and the pipette tip, and therefore an effective seal with low friction forces when mounting the pipette tip on the mount. Instead of a sealing structure that projects inward, the seat region can have a surface seal, which for example is formed by a conical, or cylindrical, or sectionally conical and sectionally cylindrical surface.

The guide structure provides a ring support or several annular supports at a distance from each other in a circumferential direction, and/or several approximately punctiform supports at a distance from each other in a circumferential direction, between the mount of the pipetting device and the pipette tip, and therefore provides an effective guide with low friction forces when mounting the pipette tip on the mount. Due to the guide structure, the pipette tip is held stably on the mount even when force is introduced from the side into the bottom end of the pipette tip during wall dispensing (dispensing liquid against a vessel wall).

The braking structure provides a ring support, or an annular support, or a ramp-like support between the mount and the pipette tip, and brakes the insertion movement of the mount into the pipette tip. The braking effect is determined by the geometry of the braking structure and of the mount, and the material properties (in particular the elasticity and roughness) of the pipette tip and mount.

According to another embodiment, the guide structure is arranged above the sealing structure, and/or the braking structure is arranged below the sealing structure. According to another embodiment, the guide structure coincides with the sealing structure, and/or the sealing structure coincides with the braking structure. To accomplish this, a guide bead can also be formed as a sealing bead, and/or a sealing bead can also be formed as a friction bead.

According to another embodiment, the tubular body has several sealing structures, and/or guide structures, and/or friction structures on the inner circumference that have a wave-shaped contour in a longitudinal section through the tubular body.

According to another embodiment, the tubular body has a widening at the top opening, and/or an insertion chamfer on the inner circumference. The widening and/or insertion chamfer facilitates the insertion of a mount of a pipetting device into the pipette tip.

According to another embodiment, the pipette tip comprises only the tubular body. According to another embodiment, the pipette tip is an air cushion pipette tip, i.e., it is configured to be used with an air cushion pipetting device. According to another embodiment, the air cushion pipette tip comprises only the tubular body.

According to another embodiment, the pipette tip consists of the tubular body and another component. The other component is, for example, a small plunger that is arranged within the tubular body and can be moved therein. This refers to a positive displacement pipette tip, i.e., a pipette tip that can be used with a positive displacement pipetting device.

According to another embodiment, the pipette tip is produced from at least one thermoplastic, preferably from at least one polyolefin, preferably from at least one polypropylene and/or polyethylene.

According to another embodiment, the pipette tip has one or more of the following features: (1)the wall thickness of the tubular body at the corners of the arc polygon falls within the range of 0.3 to 1 mm; (2) the seat region is internally conical with a downwardly tapering diameter, wherein the cone angle of the seat region is selected from the range of 1° to 6°, preferably from 1.5° to 2.5°; (3) the seat region is designed to be mounted on a mount, wherein the cone angle of the conical mount, or of the conical section of the mount, is selected from the range of 1.0° to 10°, preferably from the range of 1.3° to 7°, more preferably from the range of 1.5° to 3°; (4) the sealing structure and/or the guide structure and/or the braking structure are distributed in the longitudinal direction of the tubular body over the seat region; (5) the wall thickness of the tubular body in the region of the flattenings (outside of the sealing structure and/or guide structure and/or braking structure) is a maximum of 0.3 mm at the thinnest places; (6) the wall thickness of the tubular body in the region of the flattenings (outside of the sealing structure and/or guide structure and/or braking structure) is a minimum of 0.1 mm at the thinnest places; (7) the flattenings extend in the longitudinal direction of the tubular body over a length of at least 4 mm; and (8) the flattenings extend in the longitudinal direction of the tubular body at least over two sealing structures, and/or guide structures, and/or braking structures.

Furthermore, the disclosure relates to a pipette tip system wherein pipette tips of different pipette tip types have differently designed flattenings and/or different identifications on the flattenings.

Furthermore, the disclosure relates to a pipetting system including a single channel pipetting device having a single mount for mounting a pipette tip, and/or a multichannel pipetting device having a plurality of mounts for simultaneously mounting a plurality of pipette tips.

In the present application, the terms "vertical" and "horizontal", "top" and "bottom" as well as terms derived therefrom such as "above" and below" refer to an arrangement of the pipette tip with a vertically oriented center axis of the tubular body, wherein the top opening is at the top and the bottom opening is at the bottom.

In the present application, each cross-section through the tubular body is a plane that is oriented perpendicular to the center axis of the tubular body. Each longitudinal section through the tubular body is a plane in which the center axis of the tubular body extends.

Furthermore, the central region of the flattening describes a line or a strip-shaped zone that runs between the two side edges of the flattening, wherein the line or zone can have the same distances from the two side edges of the flattening, or can have different distances from the two side edges of the flattening.

BRIEF DESCRIPTION OF THE DRAWINGS

The invention will be explained in more detail below with reference to the accompanying drawing of exemplary embodiments. In the drawing:

FIG. 1*a* illustrates a side view of an embodiment of a pipette tip with a triangular arc polygon contour;

FIG. 1*b* illustrates the embodiment of FIG. 1*a* rotated by 90°;

FIG. 1*c* illustrates a sectional view of the embodiment of 1*b* taken along line C-C;

FIG. 1*e* illustrates a top view of the embodiment of 1*a;*

FIG. 1*f* illustrates a perspective view of the embodiment of FIG. 1*a;*

FIG. 1*g* illustrates another perspective view of the embodiment of FIG. 1*a*

DETAILED DESCRIPTION OF THE INVENTION

Figure 1D:
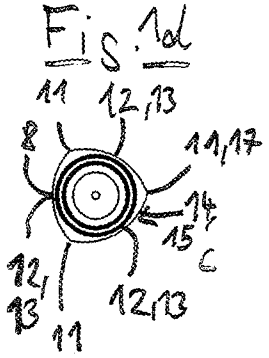
FIG. 1*d* illustrates a bottom view of the embodiment of 1*a;*

In the following explanation of different exemplary embodiments, the structures and components identified by the same names are given the same reference numbers.

According to FIG. 1, a pipette tip 1 has an elongated tubular body 2 that has a bottom opening 4 in the bottom end 3 and a top opening 6 in the top end 5. The bottom opening 4 is smaller than the top opening 6.

In general, the inner and the outer diameter of the tubular body 2 increase from the bottom opening 4 to the top opening 6. The tubular body 2 has a conical section 7 at the bottom, and above that, a head section 8 that is slightly conical in a bottom head section part 8.1 and is more strongly conical in a top head section part 8.2 (FIG. 1*a*, 10. Adjacent to the conical section 7, a downwardly directed outer shoulder 10 runs on the outer circumference 9 of the tubular body 2 around the bottom side of the head section 8.

The head section 8 of the tubular body 2 has a triangular cross-section and, between two respective adjacent corners 11, has a flattening 12 with an arc-shaped, outwardly curved profile 13 (FIG. 1*d*). Overall, the tubular body 2, in a cross-section through the head section 8, therefore has an outer contour 14 in the shape of a regular triangular arc polygon 15 that is also termed a Reuleaux triangle. Given the outer contour 14 in the shape of an arc polygon 15 and its circular inner contour 16, the head section 8 has places 17 with the thickest wall at the corners 11 of the arc polygon 15, and places 18 with the thinnest wall centrally between the corners, wherein its wall thickness gradually decreases from the places 17 with the thickest wall to the places 18 with the thinnest wall.

At the top, the tubular body 2 has a circumferential edge 19 with a corresponding wall thickness progression (FIG. 1*g*). At the top end 5, the tubular body 2 has a widening 21 with an insertion chamfer 22 on the inner circumference 20. This is shown in particular in FIG. 1*c*.

Next to the top opening 6, the tubular body 2 has a substantially conical seat region 23 on the inner circumference 20 for a conical mount 24 of a pipetting device 25. The seat region 23 extends into the head section 8 and has a cone angle of for example 2° to 6°. The seat region 23 forms a surface seal for a sealing seat of the pipette tip 1 on the mount 24.

On the inner circumference 20 below the seat region 23, the tubular body 2 has a circumferential ring groove 26 for holding on to the core of an injection mold when producing the pipette tips (FIG. 1*c*). At the bottom end of the head section 8, the inner contour of the tubular body 2 smoothly transitions into the downwardly tapering conical section 7 (FIG. 1*c*).

For clamping onto the mount 24 of a pipetting device 25, one or more pipette tips 1 can be kept ready in holes of a holder for pipette tips, wherein they are supported by the shoulder 10 on the edge of the holes. According to FIG. 1*c*, the mount 24 of a pipetting device 25 can be easily inserted into the pipette tip 1 at the top opening 6 through the widening 21 with the insertion chamfer 22. While being clamped onto the mount 24, the pipette tip 1 can be elastically and/or plastically deformed in the region of the flattenings 12, by which the mounting forces are reduced and a reliably sealing seat of the mount 24 in the seat region 22 is achieved with comparatively less mounting force. The thin-walled regions between the corners 11 bring about a reduction in the required expansion force when mounting the pipette tip 1 onto a mount 24 of a pipetting device 25, as well as correspondingly reduced mounting force and increased flexibility when using the pipette tip 1 with a pipetting device 25 that has mounts 23 with different geometries.

After pipetting liquid, the pipette tip 1 can be easily ejected from the mount 24 since the ejection forces to be applied for ejecting are also reduced. For ejection, an ejection sleeve of the pipetting device 25 guided onto the mount 24 is pressed against the circumferential edge 19 at the top end 5 of pipette tip 1, and the pipette tip 1 is scraped off of the mount 24. The thick-walled regions at the corners 11 allow the pipette tip 1 to be reliably ejected, since they offer a large support surface at the top edge 19 for mounting an ejector. Since the thick-walled regions are also formed on the shoulder 10 on the bottom side of the head section 8, they moreover create an effective support at the edge regions of holes in a holder for pipette tips. Moreover, the cross-sectional shape promotes an even distribution of stress when mounting on the mount 24, by which the pipette tip 1 is prevented from bursting in the head section 8. Finally, the cross-sectional shape of the head section 8 is also advantageous for evenly filling the injection mold with plasticized plastic compound during injection molding of the pipette tip 1.

Figure 2D:
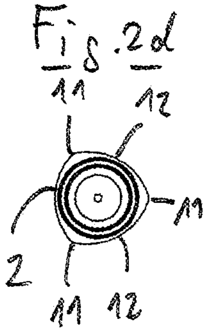
FIG. 2*d* illustrates a bottom view of the embodiment of 2*a;*
Figures 2A, 2B, 2C, 2E, 2F, 2G:
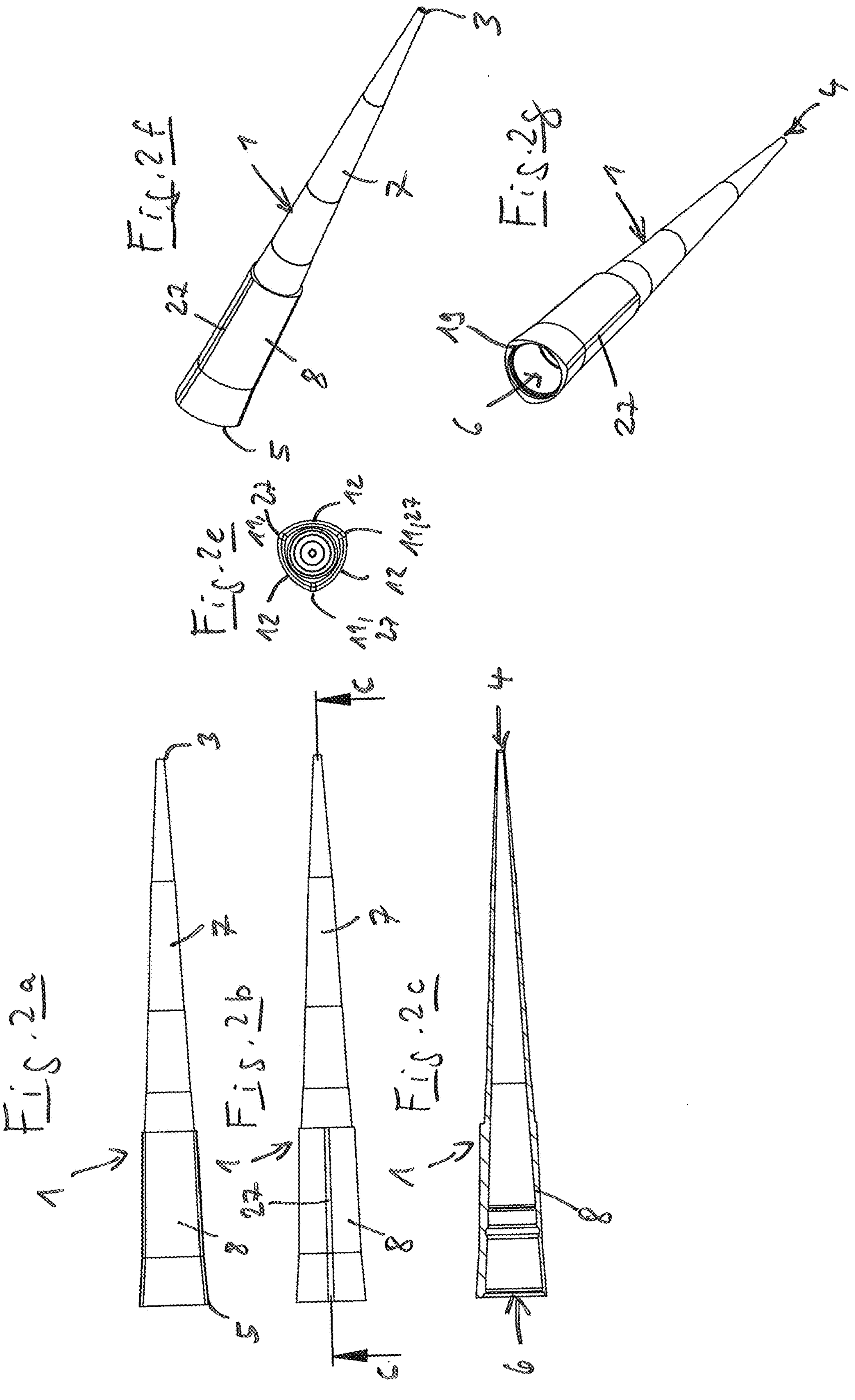
FIG. 2*a* illustrates a side view of an embodiment of a pipette tip with a triangular arc polygon contour with rounded edges.
FIG. 2*b* illustrates the embodiment of FIG. 2*a* rotated by 90°.
FIG. 2*c* illustrates a sectional view of the embodiment of 2*b* taken along line C-C.
FIG. 2*e* illustrates a top view of the embodiment of 2*a;*
FIG. 2*f* illustrates a perspective view of the embodiment of FIG. 2*a;*
FIG. 2*g* illustrates another perspective view of the embodiment of FIG. 2*a*

The pipette tip 1 of FIG. 2 differs from the pipette tip of FIG. 1 in that it has rounded corners 11, i.e., corners 11 with a radius 27, in a cross-section through the head section 8. The radius 27 is smaller than the radius of curvature of the flattenings 12.

Figures 3A, 3B, 3C, 3D, 3E, 3F, 3G:
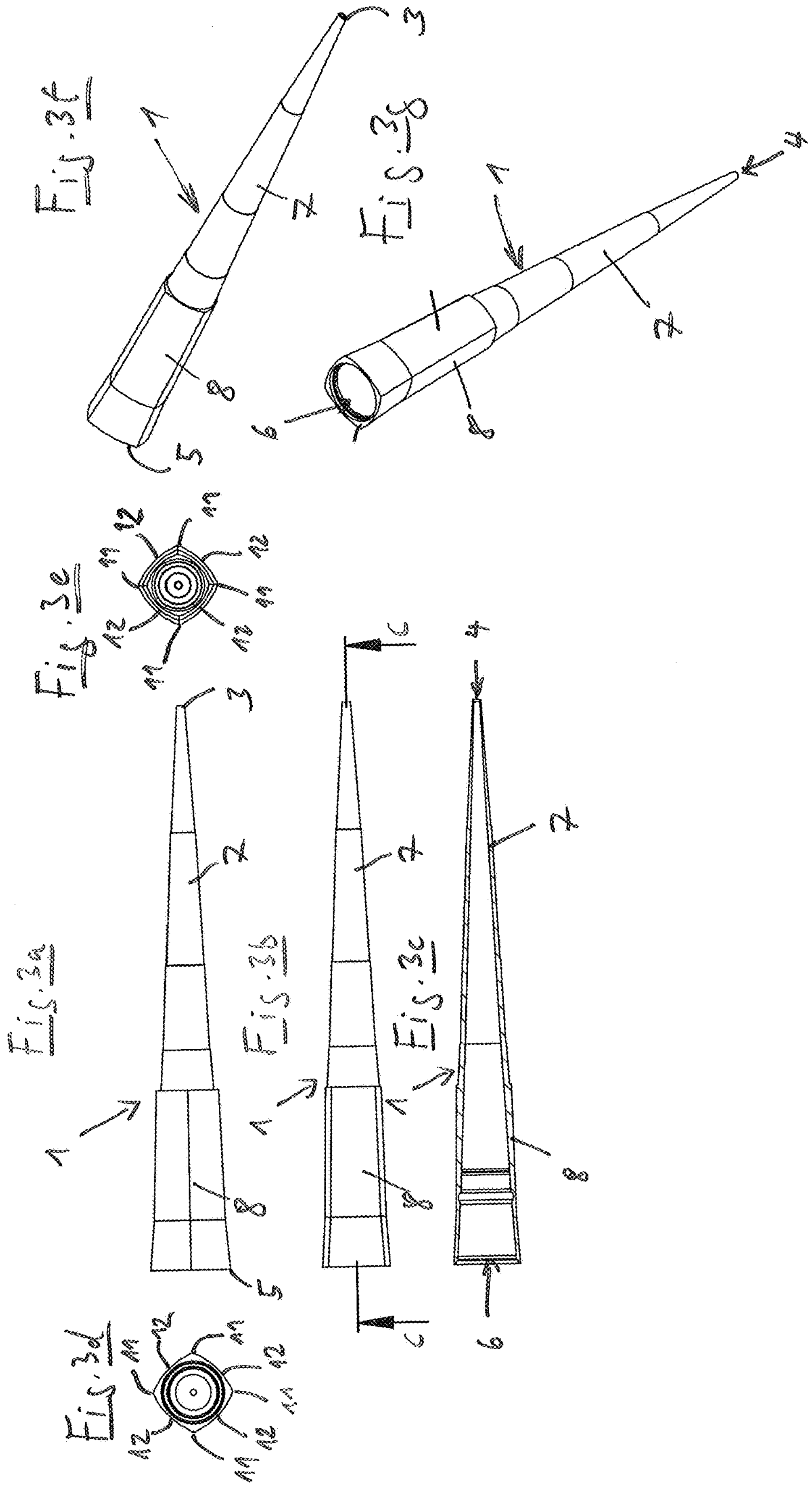
FIG. 3*a* illustrates a side view of an embodiment of a pipette tip with a rectangular arc polygon contour.
FIG. 3*b* illustrates the embodiment of FIG. 3*a* rotated by 90°.
FIG. 3*c* illustrates a sectional view of the embodiment of 3*b* taken along line C-C.
FIG. 3*d* illustrates a bottom view of the embodiment of 3*a;*
FIG. 3*e* illustrates a top view of the embodiment of 3*a;*
FIG. 3*f* illustrates a perspective view of the embodiment of FIG. 3*a;*
FIG. 3*g* illustrates another perspective view of the embodiment of FIG. 3*a;*

The pipette tip 1 of FIG. 3 differs from the pipette tip of FIG. 1 in that, in a cross-section through the head section 9, it has four flattenings 12 with an arched, outwardly curved profile 13, wherein the profiles 13 abut each other at four corners 11. The outer contour of this pipette tip 1 has the shape of a regular rectangular arc polygon 15 according to Reuleaux.

The advantageous effects of the pipette tip of FIG. 1 apply to a greater extent to the pipette tip of FIG. 3, given the high number of corners 11 and flattenings 12.

The pipette tip 1 of FIG. 4 is preferably designed to pipette smaller filling volumes (e.g., 10 μl) than the pipette tips 1 of FIGS. 1 to 3 (e.g., 200 μl). The pipette tip 1 of FIG. 4 differs from those described above in particular in that the elongated tubular body 2 has a conical central section 28 over the conical section 7, a conical transition section 29 above that, and a conical head section 8 above that with a circumferential flange 30 that projects radially outward at the top end 5. The aforementioned sections 7, 28, 29 and the flange 30 directly adjoin each other. The outer diameter of the tubular body 2 increases in principle gradually from the bottom end 3 to the flange 30. In the central section, it has small diameter projections 31 that form the fill level markers. The inner diameter of the tubular body 2 also increases in principle gradually from the bottom end 3 to the top end 5 of the tubular body 2.

On the inner circumference 20 in the seat region 23, the tubular body 2 has sealing structures 32 in the form of two inwardly projecting, unbroken, circumferential sealing beads 33 that are at a distance from each other in an axial direction. The bottom sealing bead 33 is simultaneously a braking structure 34 in the form of a braking bead 34 that has the function of stopping the insertion of a mount 24 of a pipetting device 25. To accomplish this, the bottom sealing bead 33 has a smaller inner diameter than the top sealing bead 33. Above the sealing bead 33, the seat region 23 has a guide structure 36 in the form of a plurality (e.g., 3) of guide bumps 37 or guide warts on the inner circumference that are evenly distributed over the same transverse cross-section. At the top end 5, the tubular body 2 has a widening 21 with an insertion chamfer 22 on the inner circumference 20 that terminates above the guide structure 36.

On the bottom side, the flange 30 has downwardly projecting ribs 38 that extend radially outward from the head section 8.

This pipette tip 1 also has three rounded corners 11 with radii 27 and three flattenings 12 with an arched, outwardly curved profile 13 between the corners 11. Starting from the bottom side of the flange 30, the flattenings 12 extend in an axial direction of the tubular body 2 up to the top edge region of the transition section 29.

Figures 4A, 4B, 4C, 4D, 4E, 4F, 4G:
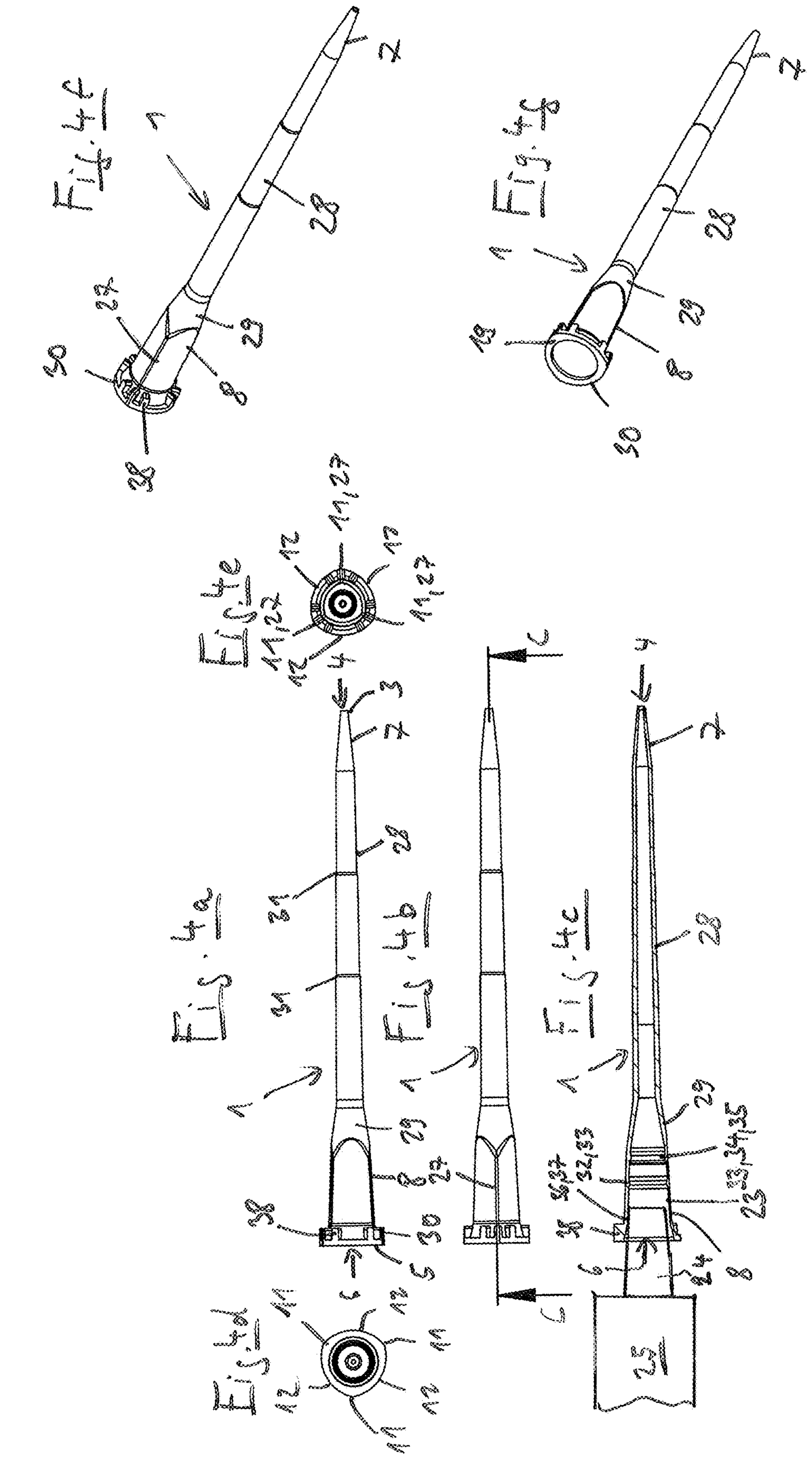
FIG. 4*a* illustrates a side view of another embodiment of a pipette tip with a triangular arc polygon contour.
FIG. 4*b* illustrates the embodiment of FIG. 4*a* rotated by 90°.
FIG. 4*c* illustrates a sectional view of the embodiment of 4*b* taken along line C-C.
FIG. 4*d* illustrates a bottom view of the embodiment of 4*a;*
FIG. 4*e* illustrates a top view of the embodiment of 4*a;*
FIG. 4*f* illustrates a perspective view of the embodiment of FIG. 4*a;*
FIG. 4*g* illustrates another perspective view of the embodiment of FIG. 4*a;*

One or more pipette tips 1 according to FIG. 4 can be provided in a holder for pipette tips. In this case, they are inserted into holes of the holder and are supported by the ribs 38 on the bottom side of the flange 30 on the edge of the holes. According to FIG. 4*c*, the mount 24 is only partially inserted into the pipette tip 1, as far as the guide structure 36. The mount 24 is advanced up to the sealing and braking bead 33, 35, such that the pipette tip 1 is clamped aligned and sealing onto the mount 24.

Figure 5:
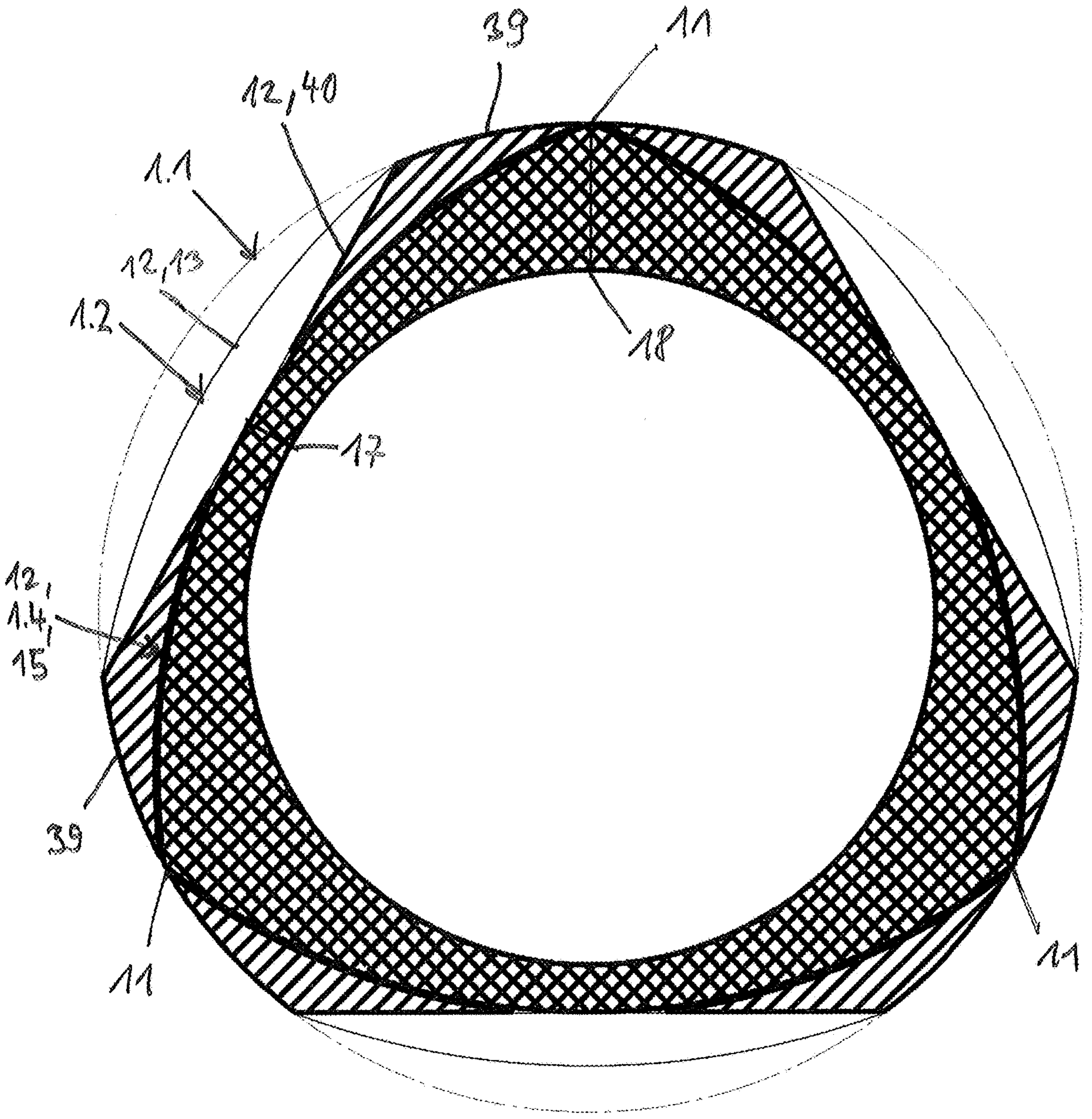
FIG. 5 illustrates stacked cross-sections through the seat region of pipette tips with an annular cross-section, flattenings with a straight profile, flattenings with an inwardly curved profile, and flattenings with the contour of a Reuleaux polygon.

By way of comparison, FIG. 5 shows the cross-sections through the seat region 23 of a hollow cylindrical pipette tip 1.1, a pipette tip 1 with flattenings 12 with an outwardly curved profile 13 between adjacent cylindrical regions 39, a pipette tip 1.3 with flattenings 12 with a linear profile 40 between adjacent cylindrical regions 39, and a pipette tip 1.4 with the outer contour of a uniform triangular arc polygon 15.

All of the pipette tips 1.1 to 1.4 have the same maximum outer diameter and the same inner diameter.

In comparison to the hollow cylindrical pipette tip 1.1, the pipette tip 1.2 with outwardly curved flattenings 12 has a significantly reduced cross-sectional area and a significantly reduced wall thickness at the places 17 with the thinnest wall.

In comparison to the pipette tip 1.2 with the outwardly curved flattenings 12, the pipette tip 1.3 with the linear flattenings 12 has an even further reduced cross-sectional area and even further reduced wall thickness at the places 17 with the thinnest wall.

The pipette tip 1.4 with the outer contour of an arc polygon 15 has the smallest cross-sectional area and the smallest wall thickness at the places 17 with the thinnest wall.

The following table presents the cross-sectional areas in a cross-section through the seat region, and the necessary radial expansion forces for an expansion of 0.1 mm at the inner circumference, according to a simulation for pipette tips with different outer contours. Furthermore, the table presents the relative savings in the force for expansion for each cross-sectional shape relative to the pipette tip with a circular cross-section presented on the second line.

| No. | Cross-sectional shape | Cross-sectional area | Expansion force | Relative savings in force |
|---|---|---|---|---|
| 1 | Thin annular ring (t = 0.25 mm) | 3.89 $mm^2$ | (1.668N) | 0.4914/49.14% |
| 2 | Thick annular ring (t = 0.6 mm) | 9.99 $mm^2$ | (3.394N) | 1.0000/100.00% |
| 3 | Annular ring with 1× groove | 9.74 $mm^2$ | (3.242N) | 0.9554/95.54% |
| 4 | Annular ring with 3× groove | 9.23 $mm^2$ | (2.940N) | 0.8664/86.64% |
| 5 | Annular ring with 10× groove | 7.46 $mm^2$ | (2.174N) | 0.6408/64.08% |
| 6 | Triangle tip | 8.01 $mm^2$ | (2.682N) | 0.7904/79.04% |
| 7 | Releaux triangle | 5.89 $mm^2$ | (2.207N) | 0.6504/65.04% |
| 8 | Releaux rectangle | 5.84 $mm^2$ | (2.162N) | 0.6370/63.70% |
| 9 | Releaux pentagon | 5.82 $mm^2$ | (2.125N) | 0.6224/62.24% |

Figure 6:
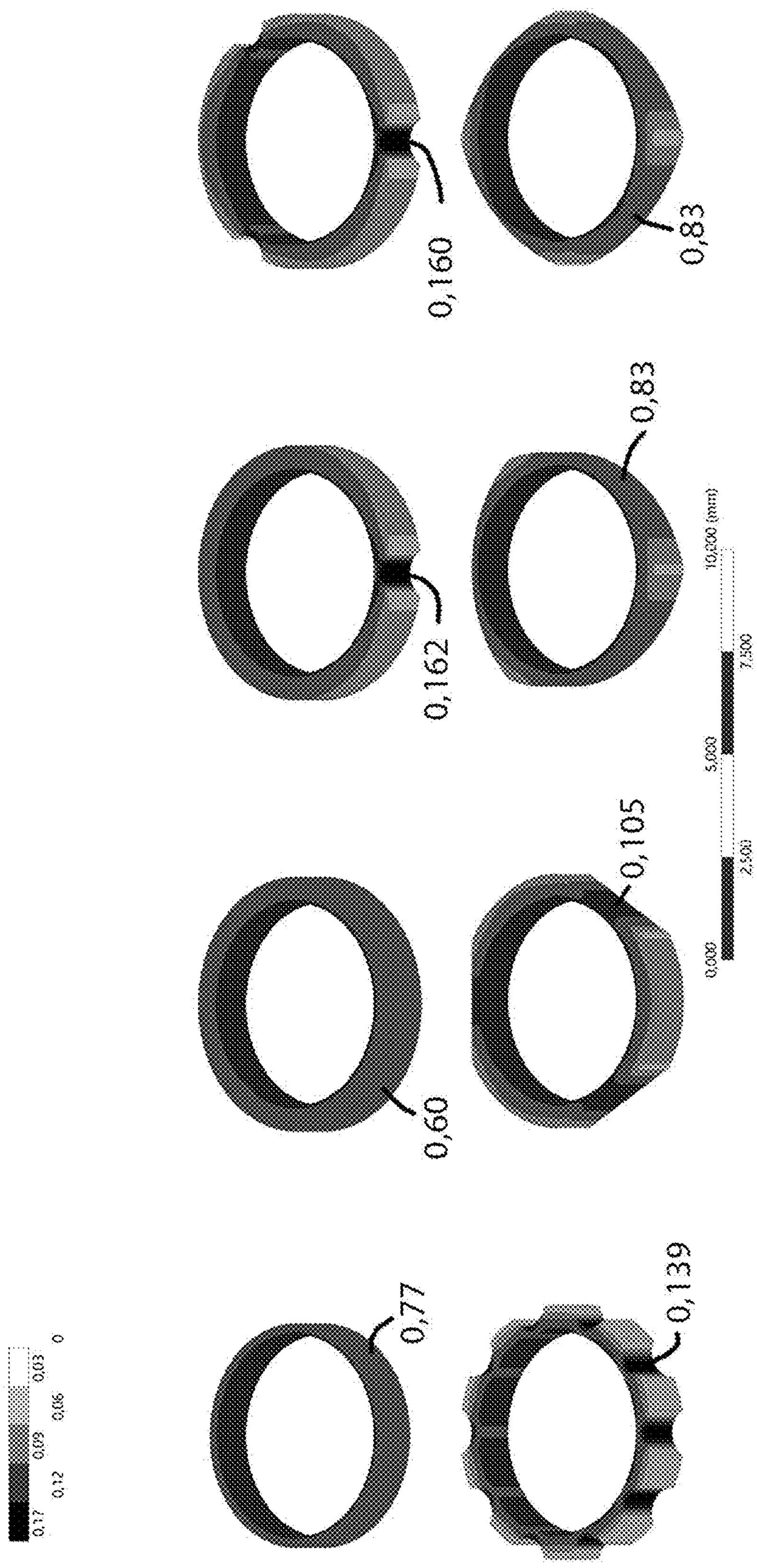
FIG. 6 illustrates a simulation of the overall deformation during a radial displacement at the inner circumference for pipette tips with different geometries.

FIG. 6 shows the deformations (elastic comparative expansion) determined in a simulation of the cross-sections of the different pipette tips. Corresponding to the shade of gray, the extent of deformation is indicated by different shades of gray.

The pipette tip listed in line 1 has the smallest cross-sectional area and requires the least expansion force for a radial expansion of 0.1 mm to achieve the greatest relative savings in force. According to FIG. 16, however, the greatest deformations occur with this cross-sectional shape (maximum comparative expansion: 0.77=77%), such that the pipette tip tears easily.

The pipette tip from line 2 of the table with the thick annular cross-section has the largest cross-sectional area and the greatest expansion forces. According to FIG. 6, the deformation is comparatively slight (maximum comparative expansion: 0.60).

According to lines 3 to 5 of the table, the pipette tips having an annular cross-section with 1, 3 or 10 grooves have correspondingly reduced cross-sectional areas and required expansion forces, such that a certain relative savings in force is achieved. FIG. 6 shows that in the grooves, comparatively large deformations (maximum comparative expansion: 0.162; 0.160; 0.139) and stress occur, such that the pipette tips tear there fairly easily.

With the pipette tip having linear flattenings from line 6, a significantly greater reduction in the cross-sectional area as well as the necessary expansion force and a corresponding relative savings in force are achieved. FIG. 6 shows that the elastic deformations (elastic comparative expansion: 0.105) and stress are comparatively small, by which the pipette tip is protected from tearing in the seat region.

According to lines 7 to 9 of the table, the pipette tips with the outer contour in the shape of an arc polygon have even smaller cross-sectional areas and reduced expansion forces, as well as a greater relative savings in force. According to FIG. 6, the deformations (elastic comparative expansion: 0.83) and tension in the cross-section are reduced even further, such that better protection against tearing is afforded.

LIST OF REFERENCE SIGNS

1 Pipette tip
2 Tubular body
3 Bottom end
4 Bottom opening
5 Top end
6 Top opening
7 Conical section
8 Head section
9 Outer circumference
10 Shoulder
11 Corner
12 Flattening
13 Curved profile
14 Outer contour
15 Arc polygon
16 Inner contour
17 Place with thickest wall
18 Place with thinnest wall
19 Circumferential edge
20 Inner circumference
21 Widening
22 Insertion chamfer
23 Seat area
24 mount
25 Pipetting device
26 Ring groove
27 Radius
28 Central section
29 Transitional section
30 Flange
31 Diameter projection
32 Sealing structure
33 Sealing bead
34 Braking structure
35 Braking bead
36 Guide structure
37 Guide bumps
38 Rib

The invention claimed is:

1. A pipette tip made of plastic and comprising:
- a tubular body including an outer circumference and an inner circumference, the tubular body comprises,
  - a bottom end defining a bottom opening configured for passage of a liquid,
  - a top end defining a top opening configured to clamp onto a mount of a pipetting device,
  - a seat region for the mount positioned proximate to the top opening and on the inner circumference of the tubular body, and
  - a plurality of flattenings extending in an axial direction on the outer circumference proximate to the top opening,
  - wherein the tubular body comprises a contour of an arc polygon in a cross-section through the flattenings on the outer circumference.

2. The pipette tip according to claim 1, wherein the flattenings extend in an axial direction at least over part of the seat region.

3. The pipette tip according to claim 1, wherein the flattenings extend upward up to a distance from the top end of the tubular body.

4. The pipette tip according to claim 1, wherein the flattenings extend up to the top end of the tubular body.

5. The pipette tip according to claim 1, wherein the flattenings extend downward to a shoulder on the outer circumference of the tubular body.

6. The pipette tip according to claim 1, wherein the tubular body comprises at least three flattenings.

7. The pipette tip according to claim 1, wherein in a cross-section through the tubular body, each of the plurality of flattenings are at least one of: (1) equally wide; and (2) equally curved.

8. The pipette tip according to claim 1, wherein in a cross-section through the flattenings of the tubular body, the tubular body comprises the contour of a regular arc polygon.

9. The pipette tip according to claim 1, wherein the flattenings run parallel to a center axis of the tubular body.

10. The pipette tip according to claim 1, wherein the flattenings are oriented helically around a center axis of the tubular body.

11. The pipette tip according to claim 1, wherein in a cross-section through the flattenings, the tubular body comprises a circular contour on the inner circumference.

12. The pipette tip according to claim 1, wherein the tubular body comprises at least one sealing structure positioned on the inner circumference of the seat region, wherein the sealing structure is configured to project inward and run.

13. The pipette tip according to claim 1, wherein the tubular body comprises at least one inwardly projecting braking structure running in a circumferential direction.

14. The pipette tip according to claim 13, wherein the tubular body comprises at least one of: (1) several sealing structures; (2) guide structures; or (3) braking structures on the inner circumference and comprising a wave-shaped contour in a longitudinal section through the tubular body.

15. The pipette according to claim 14, wherein at least one of: (1) the several sealing structures; (2) the guide structures; or (3) the braking structures are distributed in the longitudinal direction of the tubular body over the seat region.

16. The pipette tip according to claim 13, wherein the tubular body comprises a thermoplastic.

17. The pipette tip according to claim 1, wherein the tubular body comprises a widening at the top opening.

18. The pipette tip according to claim 1, wherein the tubular body further comprises at least one of the following:
- (1) a wall thickness of the tubular body at a corner of the arc polygon falls within a range of 0.3 to 1 mm;
- (2) the seat region is internally conical with a downwardly tapering diameter, wherein the cone angle of the seat region is in a range of 1° to 6°;
- (3) the seat region is configured to be mounted on a mount, wherein a cone angle of the mount or of a conical section of the mount is in a range of 1.0° to 10°;
- (4) the wall thickness of the tubular body in a region of the flattenings is a maximum of 0.3 mm;
- (5) the wall thickness of the tubular body in the region of the flattenings is a minimum of 0.1 mm;
- (6) the flattenings extend in the longitudinal direction of the tubular body over a length of at least 4 mm; or
- (7) the flattenings extend in the longitudinal direction of the tubular body at least over one of: (i) two sealing structures; (ii) guide structures; or (iii) braking structures.

19. A pipette tip system comprising:

a plurality of pipette tips, wherein each of the plurality of pipette tips includes an outer circumference and an inner circumference and further includes, a tubular body that comprises, a bottom end defining a bottom opening configured for passage of a liquid, a top end defining a top opening configured to clamp onto a mount of a pipetting device, a seat region for the mount positioned proximate to the top opening and on the inner circumference of the tubular body, and a plurality of flattenings extending in an axial direction on the outer circumference proximate to the top opening, wherein the tubular body comprises a contour of an arc polygon in a cross-section through the flattenings on the outer circumference, wherein the plurality of pipette tips comprises different pipette tips of different pipette types, wherein the flattenings of the different pipette tips of the different pipette tip types comprise flattenings that are at least one of: (1) differently configured; or (2) comprise different identifications on the flattenings.

20. A pipetting system comprising:

at least one pipette tip having a tubular body defining an outer circumference and an inner circumference, the tubular body comprises, a bottom end defining a bottom opening configured for passage of a liquid, a top end defining a top opening configured to clamp onto a mount of a pipetting device, a seat region for the mount positioned proximate to the top opening and on the inner circumference of the tubular body, and a plurality of flattenings extending in an axial direction on the outer circumference proximate to the top opening; and at least one of: (1) a single channel pipetting device comprising a single mount configured for mounting a pipette tip; and (2) a multichannel pipetting device comprising a plurality of mounts configured for simultaneously mounting a plurality of pipette tips, wherein the tubular body comprises a contour of an arc polygon in a cross-section through the flattenings on the outer circumference, and a single channel pipetting device having a single mount for mounting a pipette tip, and/or a multichannel pipetting device with a plurality of mounts for simultaneously mounting a plurality of pipette tips.

* * * * *